(12) United States Patent
Ichihara et al.

(10) Patent No.: US 7,031,091 B2
(45) Date of Patent: Apr. 18, 2006

(54) MAGNETIC RECORDING APPARATUS AND METHOD OF WRITING DATA AT LOW TEMPERATURE

(75) Inventors: Takayuki Ichihara, Tokyo (JP); Futoshi Tomiyama, Hachioji (JP); Hideki Zaitsu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 48 days.

(21) Appl. No.: 10/648,352

(22) Filed: Aug. 27, 2003

(65) Prior Publication Data

US 2004/0080848 A1    Apr. 29, 2004

(30) Foreign Application Priority Data

Sep. 18, 2002 (JP) ............................. 2002-270898

(51) Int. Cl.
*G11B 21/02* (2006.01)
(52) U.S. Cl. ........................................................ 360/75
(58) Field of Classification Search ................. 360/75, 360/69, 66, 77.04, 78.07, 6, 78.04, 319; 369/30.14, 369/47.28; 318/433
See application file for complete search history.

(56) References Cited

U.S. PATENT DOCUMENTS

| | | | | |
|---|---|---|---|---|
| 5,109,306 A * | 4/1992 | Mase et al. | ............... | 360/77.04 |
| 5,128,813 A * | 7/1992 | Lee | ........................... | 360/78.07 |
| 5,455,717 A * | 10/1995 | Van Doorn et al. | .............. | 360/6 |
| 5,630,008 A * | 5/1997 | Okuyama et al. | ........... | 388/804 |
| 6,169,930 B1 * | 1/2001 | Blachek et al. | ................ | 700/79 |
| 6,266,203 B1 * | 7/2001 | Street et al. | ................... | 360/69 |
| 6,442,109 B1 * | 8/2002 | Iida | .......................... | 369/30.14 |
| 6,445,656 B1 * | 9/2002 | Koide | ...................... | 369/47.28 |
| 6,512,647 B1 * | 1/2003 | Quak et al. | .................... | 360/66 |
| 6,542,449 B1 * | 4/2003 | Nakatsuka et al. | ......... | 369/53.1 |
| 6,574,061 B1 * | 6/2003 | Ling et al. | ..................... | 360/66 |
| 6,731,450 B1 * | 5/2004 | Codilian et al. | .............. | 360/69 |
| 6,753,667 B1 * | 6/2004 | Sakamoto | .................... | 318/533 |
| 6,775,108 B1 * | 8/2004 | Kief et al. | ................... | 360/319 |
| 6,791,785 B1 * | 9/2004 | Messenger et al. | ....... | 360/78.04 |

FOREIGN PATENT DOCUMENTS

JP        5-258215        10/1993

* cited by examiner

*Primary Examiner*—David Hudspeth
*Assistant Examiner*—Fred F. Tzeng
(74) *Attorney, Agent, or Firm*—Antonelli, Terry, Stout and Kraus, LLP.

(57) ABSTRACT

Deterioration in recording performance immediately after the start of recording in a magnetic recording apparatus due to the contraction of the magnetic head element in low atmospheric temperatures is prevented, thus ensuring a stable recording performance irrespective of the ambient temperature. Upon reception of a recording command for first data from a host device, second data already recorded in the same track as that of a data area where information is to be recorded is read and then stored in a memory. Dummy data is then recorded in the data area on the track, and then the first and second data stored in the memory is recorded. Magnetic disc apparatuses for car navigation systems, where stable operation under low temperatures is required, can be provided at low cost.

15 Claims, 7 Drawing Sheets

MAGNETIC RECORDING APPARATUS AND METHOD OF WRITING DATA AT LOW TEMPERATURE

BACKGROUND OF THE INVENTION

1. Field of the Invention

The present invention relates to a magnetic recording apparatus equipped with a magnetic head and a magnetic recording medium. Particularly, it relates to a magnetic recording apparatus that is used in low atmospheric temperatures such as below 0° C., and a method of controlling the apparatus.

2. Background Art

In recent years, magnetic recording apparatuses such as magnetic disc drives are being increasingly used as the sole storage unit for information equipment, in addition to their use as external storage units for computers, because of their superiority in terms of per unit information cost. The demand for such magnetic recording apparatuses as storage units in portable information devices or car navigation systems, for example, is particularly increasing, resulting in significantly increased ranges of temperatures in which they are used. Accordingly, there is an increasing demand for magnetic disc devices capable of stable recording and reproduction operations in wide temperature ranges.

A magnetic disc apparatus includes a magnetic recording disc that has a plurality of concentric recording tracks in which servo areas and data areas are alternately arranged circumferentially. The apparatus also includes a positioning mechanism on which a magnetic head for recording or reproducing data is supported. The apparatus is connected to a host device. Upon reception of a command for recording or reproduction of data from the host device, the positioning mechanism transports the magnetic head to a track with a data area where data should be recorded or reproduced, in accordance with servo information that is recorded in the servo areas in advance.

In the case of recording, a recording element in the magnetic head produces a magnetic field by which a target data area on the recording medium is magnetized such that the direction of magnetization is changed alternately, thereby recording information therein. In the case of reproduction, the magnetic field existing on the medium surface due to the magnetization in the recording medium is detected by a read element including a giant magneto resistive element, for example. Changes in the magnetic field are then converted into digital information to read the recorded information. The magnetic head is mounted on a head slider that travels above and relative to the disc surface with a required flying height ensured by the dynamic pressure of airflow created between the head and the disc as it rotates.

If the flying height is too large, the distance between the magnetic head and the recording medium increases, so that the recording element cannot apply sufficient magnetic field to the recording medium. Too much distance would also make it difficult for the read element to detect the recorded field near the surface of the medium. An excessive flying height thus significantly impairs the recording/reproduction performance. On the other hand, if the flying height is too small, dust in the device or bumps on the disc surface might contact the magnetic head and destroy the head elements or the disc by friction. To prevent this, the air bearing surface (ABS) of the head slider is provided with irregularities so that the head slider can be floated by just the right amount by hydrodynamic effects. Thus, the head slider can travel above and relative to the disc with a uniform air pressure, uniform relative speed, and uniform flying height.

The metal and insulator materials that compose the magnetic head expand and contract depending on the ambient temperatures. Particularly in low atmospheric temperatures, these materials contract and so the tip of the recording element retracts from the ABS of the head slider. As a result, the distance between the medium surface and the recording element increases even when the slider floating amount is constant, and the recording performance deteriorates. During recording, the materials expand due to heat generated by the application of current to an excitation coil in the recording element, so that the distance between the medium surface and the recording element gradually decreases. This leads to the problem of errors caused by recording performance deterioration upon start of recording operation, particularly in low atmospheric temperatures such as below 0° C.

As a technique for overcoming the recording performance deterioration in low atmospheric temperatures, JP Patent Publication (Kokai) No. 5-258215 discloses an invention in which recording current is increased in low atmospheric temperatures so as to increase the recording field intensity and thus enhance the recording performance. However, merely increasing the recording current has the problem that increasing the recording current results in saturation of the magnetic poles of the recording element and cannot increase the recording field, thus failing to improve the recording performance.

SUMMARY OF THE INVENTION

It is therefore an object of the invention to provide a magnetic recording apparatus in which the deterioration in recording performance after the start of recording due to the contraction of the head element in low atmospheric temperatures can be prevented, so that stable recording performance can be ensured irrespective of the atmospheric temperatures.

The magnetic recording apparatus of the invention is characterized in that, upon reception of a data recording command from a host device connected to the magnetic recording apparatus, a recording current is caused to flow in the excitation coil in the magnetic head in a certain period immediately before the recording of the data in the medium. Thus, a current other than the recording current corresponding to the intended recording data is caused to flow in the coil. Accordingly, if data is already recorded in a data area on the recording medium, the data area could be overwritten and the information recorded therein could be lost by the information (to be hereafter referred to as dummy data) corresponding to the recording current other than the intended recording data.

To avoid such a loss of information due to dummy data, the invention provides a mechanism whereby, in a first embodiment, the information that is already recorded in the data area where dummy data is to be recorded is read and stored in a memory. After recording the dummy data, the existing data stored in the memory and external data are recorded. In a second embodiment, after recording dummy data on a dummy write track, a seek is performed to a recording track where data is recorded.

In a similar technique to the dummy data writing according to the invention, dummy data is recorded in a dummy write track in the event of a read error due to a defect in a magnetic head read element, for the purpose of restoring the read element. However, this is a technique employed as part of the read operation, namely one performed upon reception of a data read command from a host device. In contrast, the dummy data writing according to the invention is carried out upon reception of a recording command from the host device as part of a recording operation.

DESCRIPTION OF THE PREFERRED EMBODIMENTS

Embodiment 1

Figure 1:
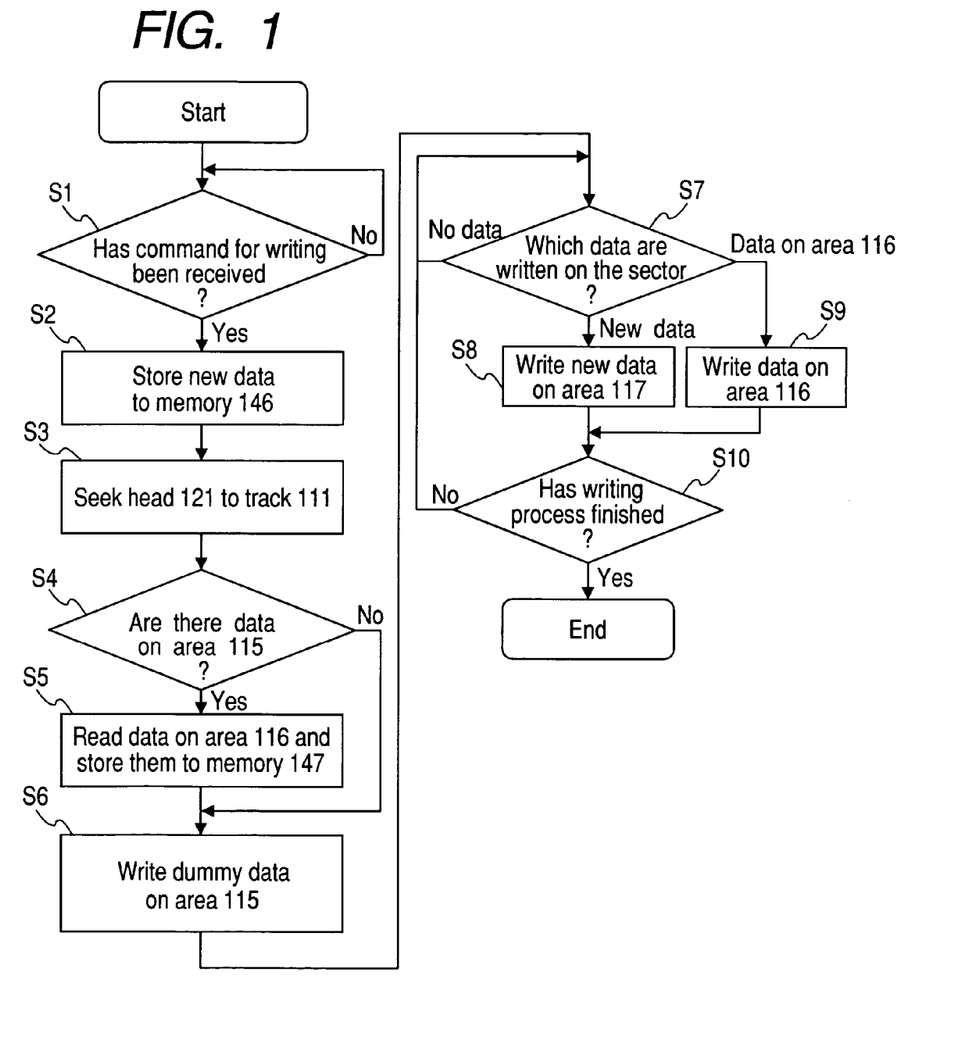
FIG. 1 shows a flowchart of a first embodiment of the invention.
Figure 2:
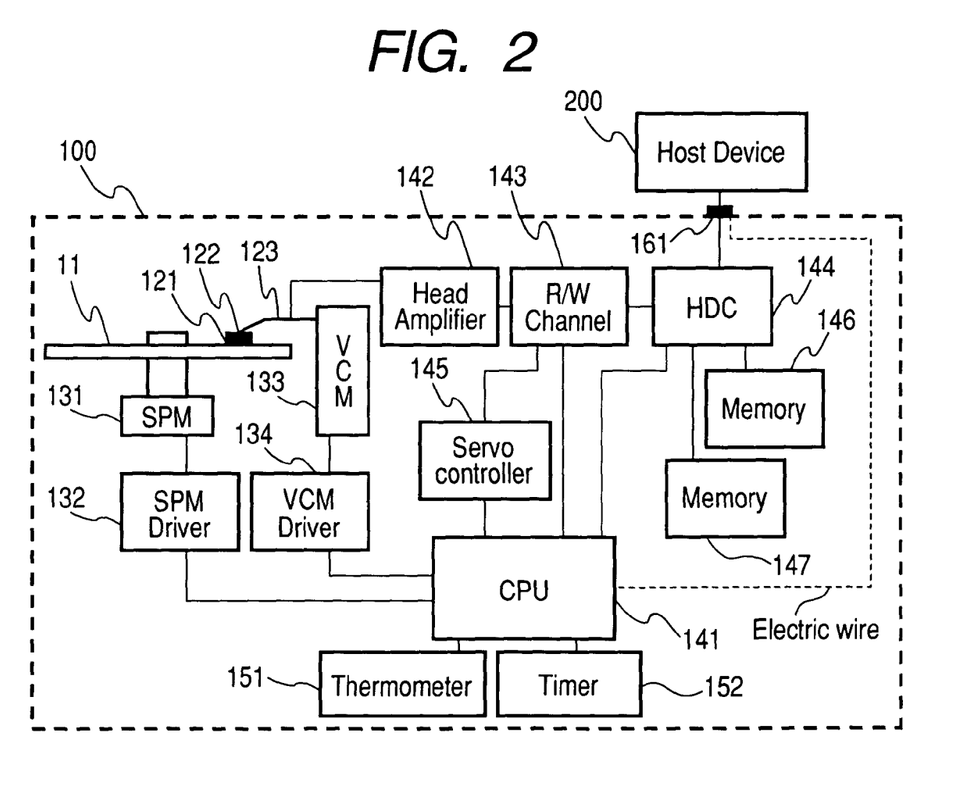
FIG. 2 shows a block diagram of the first embodiment of the invention.
Figure 3:
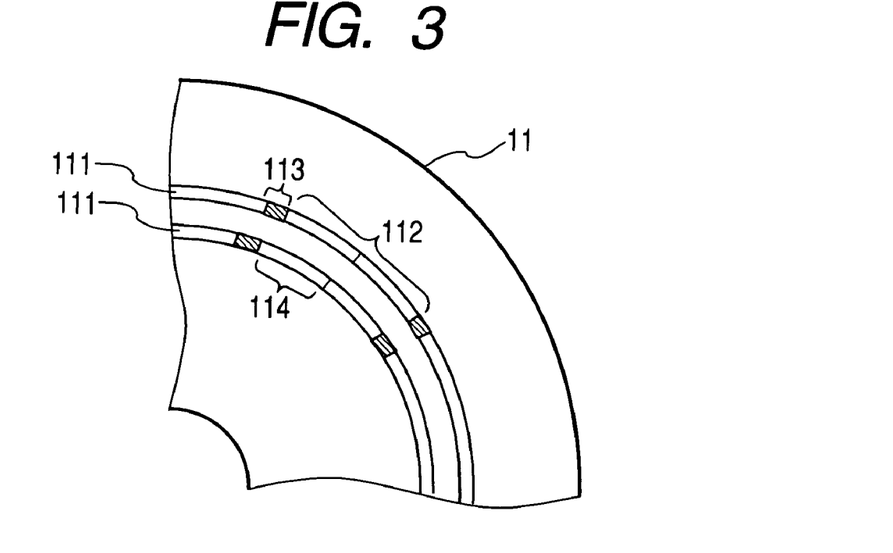
FIG. 3 shows recording tracks, data areas, and servo areas on a magnetic disc.

A magnetic disc apparatus according to a first embodiment of the invention will be described by referring to the drawings. FIG. 1 shows a flowchart of a recording operation in the first embodiment. FIG. 2 shows a block diagram of a magnetic disc apparatus 100 according to the first embodiment. FIG. 3 shows the data areas and servo areas provided on the surface of a disc 11 in magnetic disc apparatus 100 shown in FIG. 2.

Magnetic disc 11 is rotated by a spindle motor (SPM) 131. A magnetic head 121 is mounted on a slider 122 which is fixedly attached to a voice coil motor (VCM) 133 via an arm 123. During recording and reproduction, slider 122 with the head mounted thereon floats above and travels relative to disc 11. Thousands or tens of thousands of concentric recording tracks 111 are provided on the disc surface. Each track 111 includes a servo area 113 and a data area 112 that are alternately disposed along the circumference. Servo area 113 is recorded with servo information in advance. The servo information is read by a reproduction element (not shown) in magnetic head 121 and is used in calculating the radial position of head 121 in a servo processing circuit 145. Based on the radial position information, magnetic head 121 is transported along the radius of the disc by VCM 133 and seeks recording track 111 where recording or reproduction should take place.

Data area 112 is further divided into sectors 114 with 512 bytes each, for example. Position information about recorded data is managed on a sector basis. Magnetic head 121 includes an excitation coil and magnetic poles as recording elements. They induce a recording magnetic field based on a recording current waveform sent from a head amplifier 142, whereby magnetic disc 11 is recorded. Recording/reproduction instructions are received from a host device via a terminal 161.

Figure 4:
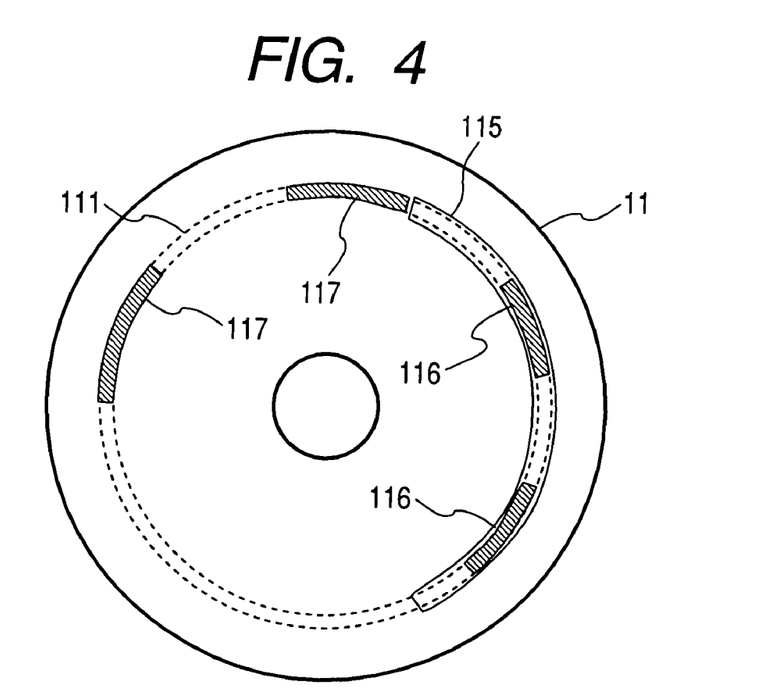
FIG. 4 shows dummy data recording areas on a track in the first embodiment.

FIG. 4 shows the relationship between data and dummy-data. Numeral 111 designates tracks. Recording data received from the host device is recorded in a data area 117. Dummy data is recorded in a recording area 115. Numeral 116 designates a data area on which dummy data has been overwritten. Prior to the end of recording operation, both dummy data area 115 and recording data area 117 are yet to be written.

After magnetic disc apparatus 100 received a write command from host device 200 (S1), new data is stored in a first memory 146 (S2). Then, head 121 is positioned to track 111 where a sector 114 for the recording of new data is located (S3). CPU 141 then determines whether or not an already recorded data area 116 exists in dummy data area 115 (S4).

If data on the area 116 is not stored, a dummy data recording operation is carried out (S6). If there is data on the area 116 that is already recorded in dummy data recording area 115, data on the area 116 is read and stored in a second memory 147 (S5). Second memory 147 may be the same as first memory 146.

By using a nonvolatile memory such as flash memory in the second memory 147, data loss due to power outage during a data writing operation can be prevented. After all of the existing data on the area 116 has been read, the dummy data is recorded in a sector (not shown) in dummy data recording area 115 (S6). A dummy data pattern is registered in a memory element such as a ROM (not shown) or first memory 146 in advance. It is transferred to a read/write (R/W) channel 143 via a hard disc controller 144 in the same manner as the recording data, and a recording current corresponding to the data pattern is supplied from head amplifier 142 to head 121.

Figure 5:
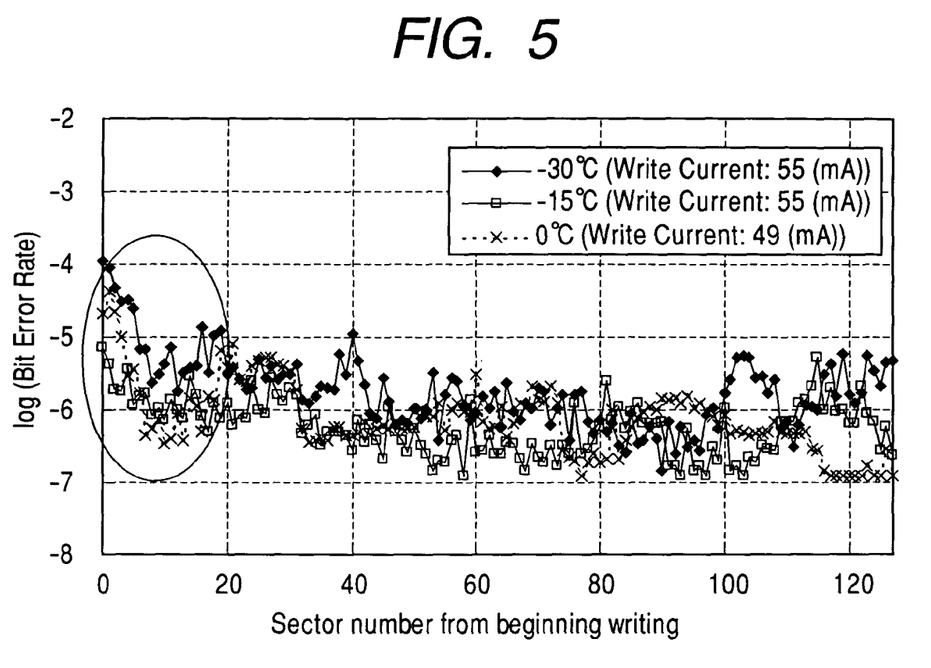
FIG. 5 shows a characteristics chart illustrating the recording-time dependency of bit error rate in low ambient temperature.

The size of dummy data area 115 is determined by the time required for the head element to recover its writing performance as it expands due to the temperature rise in head 121 caused by the writing of the dummy data, and the relative speed between the magnetic head and the disc. FIG. 5 shows changes in bit error rate after the start of writing in the magnetic disc apparatus in ambient temperatures ranging from 0° C. to −30° C.

The chart shows the error rate is stabilized at lower values after about 20 sectors (about 2 ms), indicating the recovery of writing performance. The data shows that sufficient effects can be obtained by recording dummy data for about 2 ms in the case of ambient temperatures below 0° C. When the ambient temperature is lower than 0° C., it is necessary to increase the dummy-data recording current, or to increase the dummy-data length and increase the time during which current is caused to flow in the excitation coil. While the dummy data may have an arbitrary pattern, the head temperature can be increased in a shorter time by using shorter periods of reversal of the recording current. Further, while the dummy data may be written in any sector on track 111, the head temperature can be increased in a shorter time by writing in successive sectors so that the writing performance can be improved in a shorter time.

The magnetic disc apparatus according to the present embodiment includes a temperature sensor in the casing. Using the sensor, the temperature of the place where the disc apparatus is installed can be monitored. Temperature information obtained by the temperature sensor is sent to CPU 141, which then calculates the value of the current caused to flow in the excitation coil, the dummy-data pattern, and the length of the dummy data. The dummy-data pattern and the current value may be calculated on a case-by-case basis. Preferably, however, a temperature/dummy data association table containing current values and data patterns may be stored in a memory element such as a resistor or latch in CPU or memory 146 or 147 in advance, so that optimum current value and waveform pattern can be selected depending on the information provided by the temperature sensor.

The temperature measuring means may employ a temperature sensor provided in the host device rather than in the casing of the magnetic disc apparatus. In this case, a transmission line (the dotted line in the drawing) is provided between a terminal 161 and CPU 141 for transmitting temperature information, thus using part of the terminal pin as a temperature information transmission terminal. Alternatively, a separate terminal may be provided for transmission of temperature data.

The generated dummy data is sent to head amplifier 142. The head amplifier 142 opens the write gate in accordance with the timing information delivered from the R/W channel in order to cause a recording current waveform to flow in the excitation coil formed in magnetic head 121. As a result, a recording magnetic field develops in the recording magnetic poles.

After the recording of the dummy data, external data stored in memory 146 or existing data on the area 116 recorded in memory 147 are recorded in sectors (not shown) on track 111 (S8, S9). The sector where the recording data is to be recorded is designated by the hard disc controller, such that the new data is recorded in a new data recording sector and existing data on the area 116 is recorded in an existing data recording sector (S7–S9). While existing data on the area 116 may be written in an arbitrary sector on track 111 where no data is written, writing in the same sector as prior to the wiring of the dummy data would eliminate the need for updating the recording position information. After the new data and existing data on the area 116 have all been written (S10), write-end information is transmitted to host device 200 to end the write operation.

Figure 8:
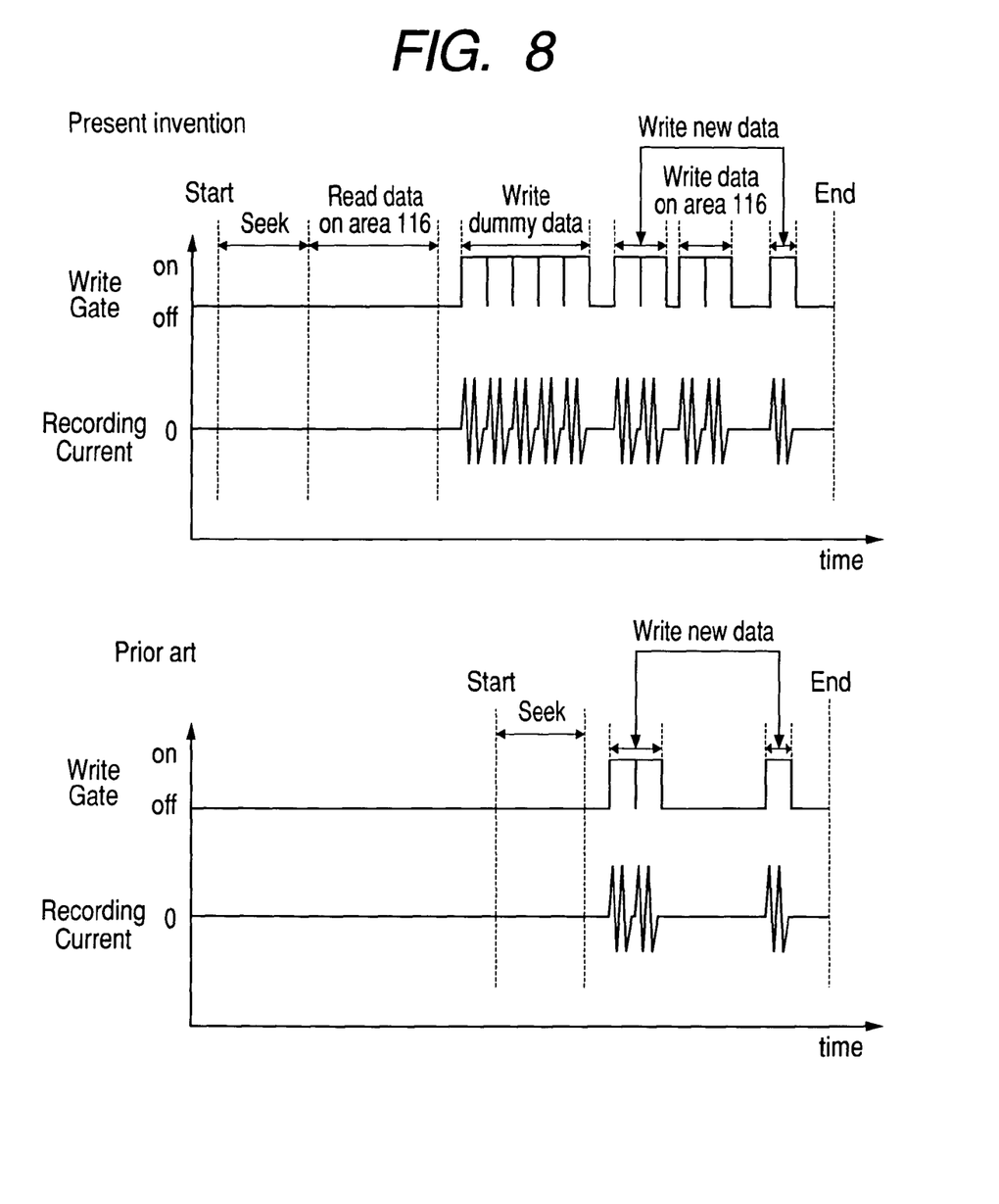
FIG. 8 shows a time chart of a write gate signal and recording current during the recording operation in the invention in comparison with the prior art.

FIG. 8 shows a time chart of a write gate signal and recording current during the recording operation in the invention in comparison with the prior art. The horizontal axis indicates time and the vertical axis indicates signal amplitude. The time chart shows that after the reception of a recording command from the host device, the step of reading the existing data and the step of recording dummy data are carried out following the end of the target track seek operation. Thus, it will be seen that the present invention is greatly different from the prior art.

In the operation processes described above with reference to FIGS. 1 to 4, the dummy data, existing data on the area 116, and new data are sent to the R/W channel separately. Preferably, however, the dummy data and the recording data may be sent to the head amplifier together.

The dummy-data recording operation in the above embodiment may not be carried out if the temperature at the location where the magnetic recording apparatus is installed is high (such as room temperature). Accordingly, a recording mode including the recording of the dummy data and a normal mode that does not include it may be prepared as sequences, so that the two modes can be switched depending on the measured temperature. The two recording operation sequences may be stored in CPU 141, hard disc controller 144, or a separate nonvolatile memory. In this case, whether or not the dummy data is recorded after the reception of recording command from the host device is determined by CPU 141 based on the result of temperature measurement.

By thus providing an ambient temperature measuring means and carrying out the dummy-data recording according to the invention only below a certain ambient temperature, the need for generating the dummy data for each instance of recording operation can be eliminated. As a result, the recording operation speed of the apparatus as a whole can be increased.

By thus carrying out the recording of dummy data during a recording operation, the deterioration in recording characteristics immediately after the start of recording in lower temperatures can be prevented.

Embodiment 2

Figure 6:
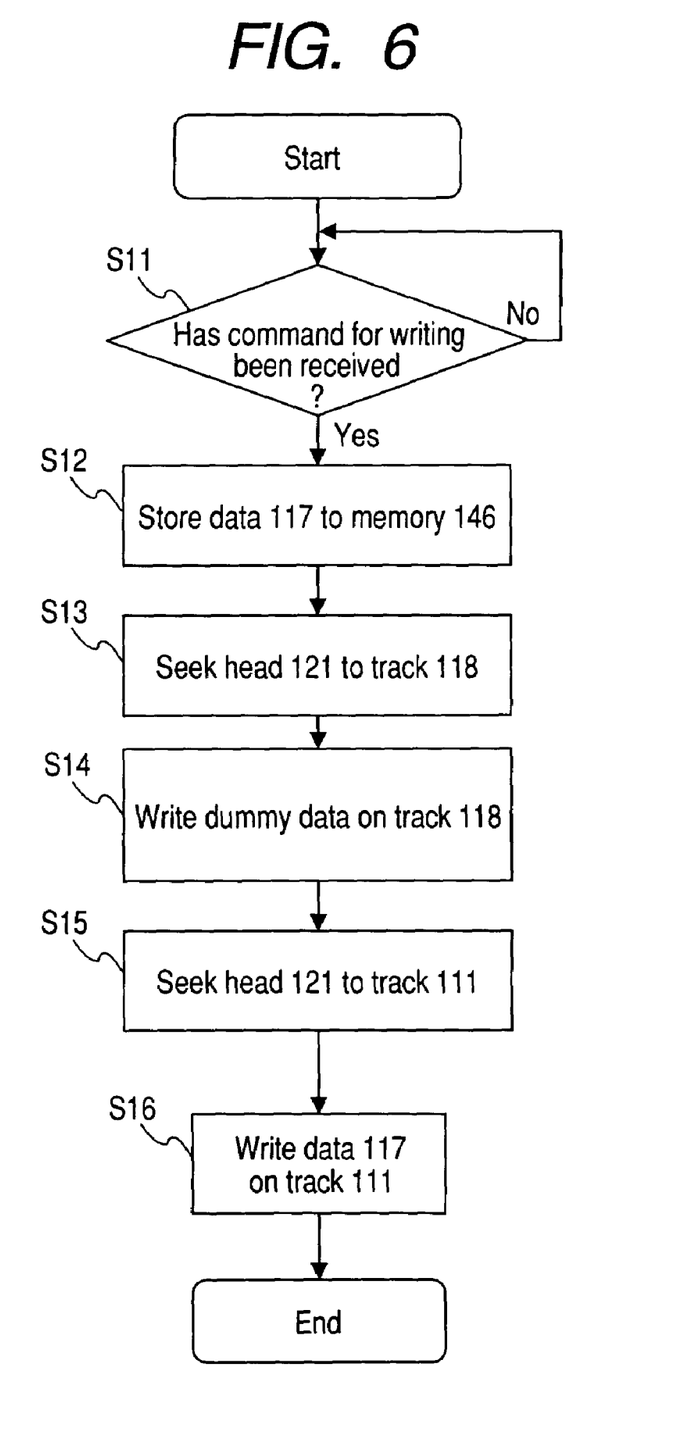
FIG. 6 shows a flowchart of a second embodiment of the invention.
Figure 7:
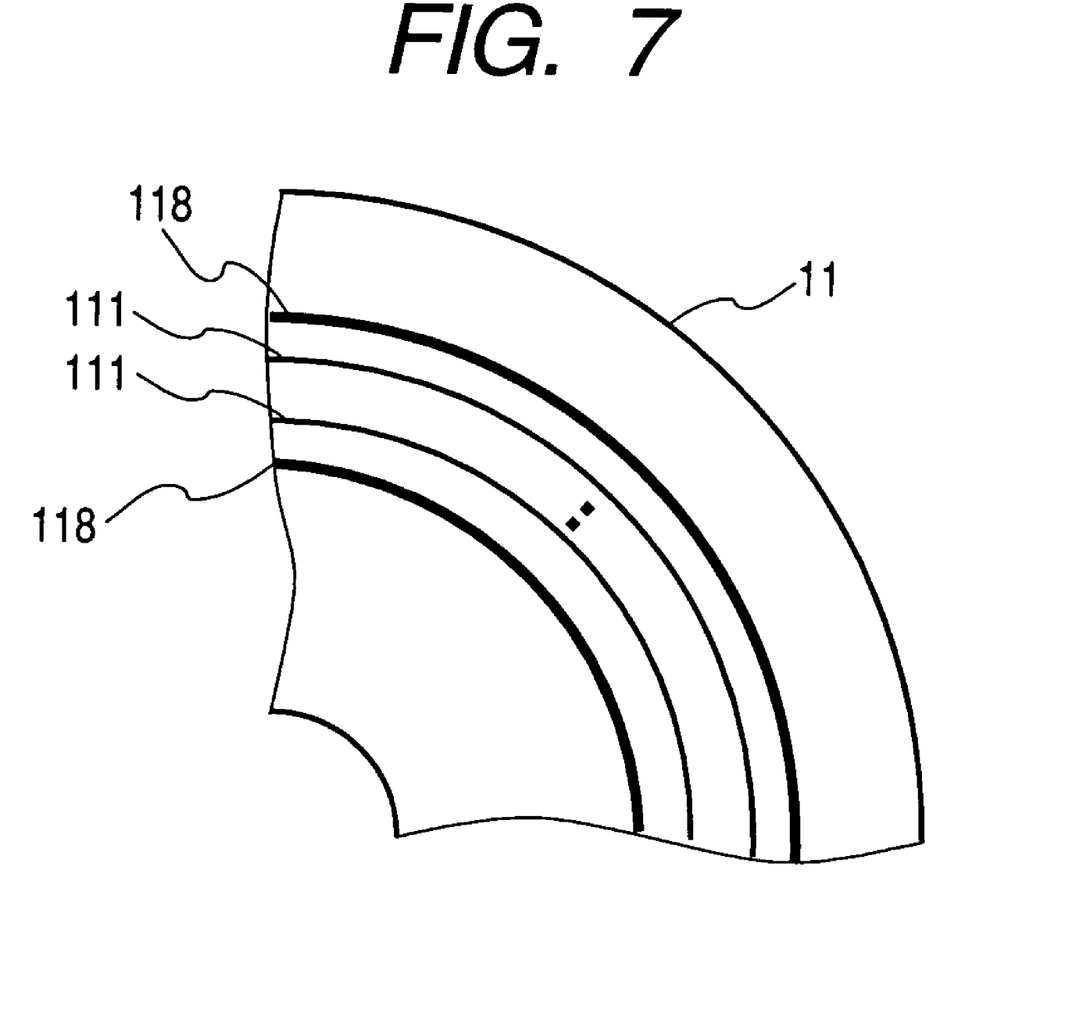
FIG. 7 shows dummy write tracks on the disc in the second embodiment.

FIG. 6 shows a flowchart of the second embodiment of the invention. FIG. 7 shows dummy write tracks. Regarding the structure of the magnetic disc apparatus, the second embodiment is similar to the first embodiment in many parts and will therefore be described using similar reference numerals to those of FIG. 2. After magnetic disc apparatus 100 received a write command from host device 200, a seek is performed to one or a plurality of dummy write tracks 118. While the number of the dummy write tracks may be one in principle, preferably a plurality of dummy write tracks should be provided so as to prevent the cooling during seeks.

FIG. 7 shows an example where a plurality of dummy write tracks are provided at certain radial intervals. After a seek to dummy write track 118 (S13) is completed, the dummy data is recorded (S14). The size of the dummy data is determined by the time required for the head element to recover its writing performance as it is expanded due to the temperature rise in the head 121 caused by the writing of the dummy data, and the head-disc relative speed, as in the first embodiment. After the writing of the dummy data is completed, a seek is performed to track 111 where the new data is written (S15). After all of the new data has been written (S16), write-end information is transmitted to host device 200 to end the writing operation.

The magnetic recording apparatus according to the present embodiment includes a timer, as shown in FIG. 2. The temperature of the head is high immediately after a sufficient amount of recording current has been caused to flow. In the absence of a recording operation for an extended period of time, the head cools down, so that the head element contracts. The contraction can be pronounced if the temperature of the location where the apparatus is installed is very low. A timer 152 measures the time elapsed from the end of the last write operation, and the above-described dummy-data recording sequence is conducted if no write operation has been carried out for a certain duration of time. The threshold in the determination of whether or not to carry out a dummy-data recording may be set arbitrarily. By thus providing a timer, the need to generate dummy data every time a recording operation is carried out can be eliminated, so that the recording operation speed of the apparatus as a whole can be increased. Preferably, the timer may be used in combination with the temperature measuring means described above. In this case, a finer operation control can be carried out by varying the determination threshold depending on the temperature range, for example.

Thus, in the absence of a write command for a certain period of time in low atmospheric temperatures, the temperature of the magnetic head is increased, upon reception of a write command, by causing a recording current to flow therein by a dummy-data write operation prior to the writing of data. In this way, the recording performance in low atmospheric temperatures can be improved.

Furthermore, the present invention can be realized by providing a memory area for storing the existing data in the first embodiment and a dummy write track in the second embodiment. Thus, the invention does not require any major changes to be made in the conventional magnetic disc apparatus, such as in its magnetic head or disc. Accordingly, the invention can provide an inexpensive magnetic disc apparatus for car navigation systems, for example, where stable operation is required at low temperatures.

According to another aspect of the invention, the following methods are provided 1. A method of controlling a magnetic recording apparatus comprising a magnetic head including an excitation coil, a magnetic recording medium, a data transmission means connected to a host device, and a head amplifier, the method comprising the steps of:
   receiving a recording command and recording data from the host device;
   causing an electric current to flow in the excitation coil in the magnetic head upon reception of the recording command and prior to the transmission of a recording current corresponding to the data to the magnetic head.

2. A method of controlling a magnetic recording apparatus comprising a magnetic head including an excitation coil, a magnetic recoding medium, a head amplifier including a write gate, a terminal for receiving a signal from a host device, a hard disc controller, and an actuator, the method comprising the steps of:
   receiving recording data transmitted from the host device;
   moving the magnetic head to a track on the recording medium that is designated by the hard disc controller;
   opening the write gate after the magnetic head has been settled to the track and prior to the arrival of a recording current waveform corresponding to the recording data to the magnetic head.

3. The method of controlling a magnetic recording apparatus according to 1, further comprising the step of measuring the temperature of the location where the magnetic recording apparatus is installed, wherein
   the method carries out the steps recited in 1 if the temperature measured by the temperature measuring means is below a predetermined value.

4. The method of controlling a magnetic recording apparatus according to 1, further comprising the step of measuring the time difference between the time when the last recording operation was conducted and the current time, wherein the method carries out the steps recited in 1 if the time difference is greater than a predetermined value.

5. A method of controlling a magnetic recording apparatus comprising a magnetic head, a magnetic recording medium, a data transmission means connected to a host device, and a head amplifier, the method comprising the steps of:
   receiving a recording command and recording data from the host device;
   producing a signal current corresponding to the recording data and dummy data by the head amplifier; and
   transmitting the signal current to the magnetic head.

6. The method of controlling a magnetic recording apparatus according to 5, further comprising the step of measuring the temperature of the location where the recording apparatus is installed, wherein the method carries out the step of producing a signal current comprising the recording data to which dummy data has been added if the temperature is below a predetermined value.

7. The method of controlling a magnetic recording apparatus according to 5, further comprising the step of measuring the time difference between the time when the last recording operation was carried out and the time when a recording command was newly received from the host device, wherein the method carries out the step of producing a signal current corresponding to the recording data and dummy data if the time difference is greater than a predetermined value.

8. The method of controlling a magnetic recording apparatus according to 5, further comprising the step of storing the data that is already recorded in the data sector where the dummy data is to be recorded in a memory.

9. A method of controlling a magnetic recording apparatus comprising a data track, a magnetic recording medium having a dummy data track, a magnetic head, a data transmission means connected to a host device, and a head amplifier, the method comprising the steps of:
   receiving a recording command and recording data from the host device;
   producing a signal current corresponding to dummy data by the head amplifier;
   moving the magnetic head to the dummy data track;
   recording the dummy data in the dummy data track;
   producing a signal current corresponding to the recording data by the head amplifier;
   moving the magnetic head to the data track; and
   recording the recording data in the data track.

What is claimed is:

1. A magnetic recording apparatus comprising:
   a magnetic recording medium;
   a magnetic head including a recording magnetic pole and an excitation coil for producing a magnetic field for exciting the recording magnetic pole so as to record information on the magnetic recording medium;
   a terminal for receiving a recording command and recording data from a host device; and
   a temperature measuring means and a head amplifier, wherein
   the head amplifier, upon reception of the recording data, causes an electric current to flow in the excitation coil prior to the start of recording of the data using the magnetic head, and
   the intensity of the recording current sent from the head amplifier to the excitation coil is varied depending on the temperature measured by the temperature measuring means.

2. The magnetic recording apparatus according to claim 1, wherein the head amplifier, if the temperature measured by the temperature measuring means is below a predetermined value, causes a current to flow in the excitation coil in the magnetic head after the reception of the recording data and prior to the start of recording of the data by the magnetic head.

3. The magnetic recording apparatus according to claim 2, wherein if the temperature measured by the temperature measuring means is below a predetermined value, the head amplifier causes a current to flow in the excitation coil before the magnetic head arrives at a sector where the recording data is to be recorded.

4. The magnetic recording apparatus according to claim 2, wherein the intensity of the recording current supplied from the head amplifier to the excitation coil is varied depending on the temperature measured by the temperature measuring means.

5. The magnetic recording apparatus according to claim 1, further comprising a timer, wherein, if no writing into the magnetic recording medium takes place for a predetermined period of time, the head amplifier, upon reception of the recording data, causes a current to flow in the excitation coil in the magnetic head prior to the start of recording of the data by the magnetic head.

6. A magnetic recording apparatus comprising:
a magnetic recording medium;
a magnetic head including a recording magnetic pole and an excitation coil for producing a magnetic field for exciting the recording magnetic pole so as to record information on the magnetic recording medium;
a temperature measuring means and a head amplifier having a write gate;
a terminal for receiving a signal from a host device;
a hard disc controller connected to the terminal; and
an actuator, wherein
the actuator, upon reception of a recording command from the host device via the terminal, moves the magnetic head to a track on the recording medium that is designated by the hard disc controller,
the head amplifier opens the write gate after the settling of the magnetic head and prior to the recording of the recording data in a sector by the magnetic head, and
the intensity of the recording current sent from the head amplifier to the excitation coil is varied depending on the temperature measured by the temperature measuring means.

7. A magnetic recording apparatus comprising:
a magnetic recording medium;
a magnetic head including a recording magnetic pole and an excitation coil for producing a magnetic field for exciting the recording magnetic pole so as to record information on the magnetic recording medium;
a terminal for receiving a signal from a host device;
a hard disc controller connected to the terminal;
a temperature measuring means and a head amplifier; and
an actuator, wherein
the actuator, upon reception of a recording command from the host device via the terminal, moves the magnetic head to a track on the recording medium that is designated by the hard disc controller,
a recording current is caused to flow in the excitation coil after the settling of the magnetic head and before the magnetic head arrives at a sector where the recording data is to be recorded, and
the intensity of the recording current sent from the head amplifier to the excitation coil is varied depending on the temperature measured by the temperature measuring means.

8. A magnetic recording apparatus comprising:
a magnetic recording medium;
a magnetic head including a recording magnetic pole and an excitation coil for producing a magnetic field for exciting the recording magnetic pole so as to record information on the magnetic recording medium;
a temperature measuring means and a head amplifier; and
a terminal for receiving a signal from a host device, wherein
the head amplifier, upon reception of a recording command from the host device via the terminal, produces a recording current comprising dummy data to which recording data sent from the host device is added and transmits the recording current to the magnetic head, and
the intensity of the recording current sent from the head amplifier to the excitation coil is varied depending on the temperature measured by the temperature measuring means.

9. The magnetic recording apparatus according to claim 8, further comprising a dummy track for recording only the dummy data.

10. The magnetic recording apparatus according to claim 8, wherein, if the temperature measured by the temperature measuring means is below a predetermined value, the head amplifier produces a recording current comprising recording data to which dummy data is added.

11. The magnetic recording apparatus according to claim 8, further comprising a timer means, wherein
if no writing into the magnetic recording medium takes place for a predetermined period of time, the head amplifier produces a recording current comprising recording data to which dummy data is added, if the temperature measured by the temperature measuring means is below a predetermined value.

12. The magnetic recording apparatus according to claim 8, further comprising a memory for storing the data that has been recorded in the data sector where the dummy data is recorded.

13. The magnetic recording apparatus according to claim 12, where the memory is a nonvolatile memory.

14. The magnetic recording apparatus according to claim 8, further comprising a hard disc controller, wherein
the hard disc controller, prior to transmitting the recording current to the excitation coil, causes the magnetic head to read the data recorded in the sector where the dummy data is to be recorded, stores the thus read data in the memory, and, after the information comprising the recording data to which the dummy data has been added is recorded in the recording medium, records the information stored in the memory in the same sector as prior to reading.

15. A magnetic recording apparatus comprising:
a magnetic recording medium;
means for recording information on the magnetic recording medium including a magnetic head having a recording magnetic pole and an excitation coil for producing a magnetic field for exciting the recording magnetic pole so as to record information on the magnetic recording medium;
means for transmitting a recording current to the recording means;
means for receiving a signal from a host device;
means for receiving a signal from the terminal and for controlling the recording-current transmission means; and
a temperature measuring means and a head amplifier, wherein
the transmission means, after the signal reception means receives a recording command from the host device, produces a recording current corresponding to recording data received by the signal reception means from the host device and to dummy data, and transmits the current to the recording means, and
the intensity of the recording current sent from the head amplifier to the excitation coil is varied depending on the temperature measured by the temperature measuring means.

* * * * *